July 7, 1959 W. L. GLOMB 2,894,153

TIME DELAY CIRCUIT

Filed Oct. 10, 1955

INVENTOR
WALTER L. GLOMB
BY Alfred C. Hill
AGENT

United States Patent Office 2,894,153

Patented July 7, 1959

2,894,153

TIME DELAY CIRCUIT

Walter L. Glomb, Clifton, N.J., assignor to International Telephone and Telegraph Corporation, Nutley, N.J., a corporation of Maryland Application October 10, 1955, Serial No. 539,530

10 Claims. (Cl. 307—106)

Figure 1:
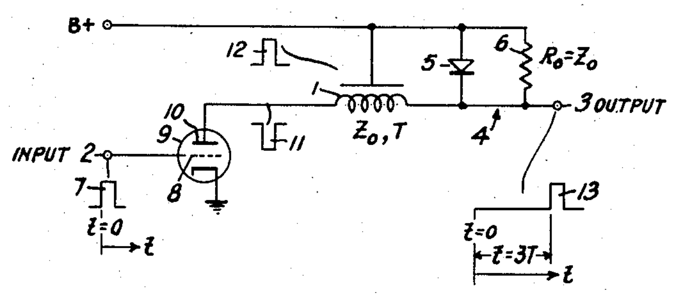

This invention relates to delay lines and more particularly to means for increasing the effective time delay of a given delay line.

The employment of delay lines to shift a pulse in time some predetermined amount is well known in the art. It is recognized that where the time delay is of necessity long the delay lines are of considerable length and become bulky. In the past, it has been proposed, to terminate the receiving end of the delay line in an impedance other than its characteristic impedance, to establish a reflected pulse therealong. The reflected pulse is removed at the input end of the delay line, thereby effectively doubling the effective time delay of the delay line without increasing its physical size.

It is an object of this invention to provide a time delay circuit which provides still a further increase in the effective time delay of a delay line of given physical size.

Another object of this invention is to provide a time delay circuit comprising a delay line having a given time delay, said line having terminations at each end capable of reflecting pulse energy of certain polarity, one of said terminations being adapted to invert pulses of a given polarity upon reflection thereof, and the other of said terminations being adapted to reflect pulses without inverting them, said line having input means for applying pulse energy thereto, and an output for said line coupled thereto at a point with respect to said input means to remove pulse energy from said line after it has traversed said line a plurality of times.

A feature of this invention is the provision of a non-linear terminating impedance for a delay line responsive to pulse energy of one polarity to terminate said delay line in a reflecting impedance and responsive to pulse energy of the other polarity to terminate said delay line in its characteristic impedance.

Another feature of this invention is the provision, in combination with a delay line having a given time delay, of a non-linear terminating impedance, as described above, at one end of said line, an open terminating impedance at the other end of said line, and a source of input pulse energy of given polarity applied at the open-circuited end of said line to produce output pulse energy at the non-linear terminated end of said line delay in time from said pulse energy source three times longer than said given time delay.

Still another feature of this invention is the provision, in combination with a delay line having a given time delay, of a non-linear terminating impedance, as described above, at one end of said line, an open-circuit terminating impedance at the other end of said line, and a source of input pulse energy having a positive and a negative component applied at the open-circuited end of said line to produce output pulse energy at the non-linear terminated end of said delay line wherein one component of input pulse energy is delayed twice said given time delay with respect to the other component of input pulse energy, said output pulse energy being of the same polarity.

A further feature of this invention is the provision, in combination with a delay line having a given time delay, of a non-linear terminating impedance, as described above, at one end of said line, a short-circuit terminating impedance at the other end of said line, and a source of input pulse energy of given polarity applied at the non-linear terminated end of said delay line to produce output pulse energy at the non-linear terminated end of said delay line of a double-pulse type wherein one pulse thereof is delayed in time from the other of said pulses corresponding to four times said given time delay.

Figure 2:
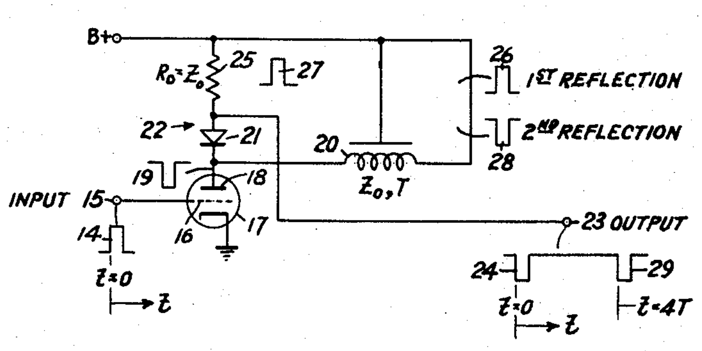
Figure 3:
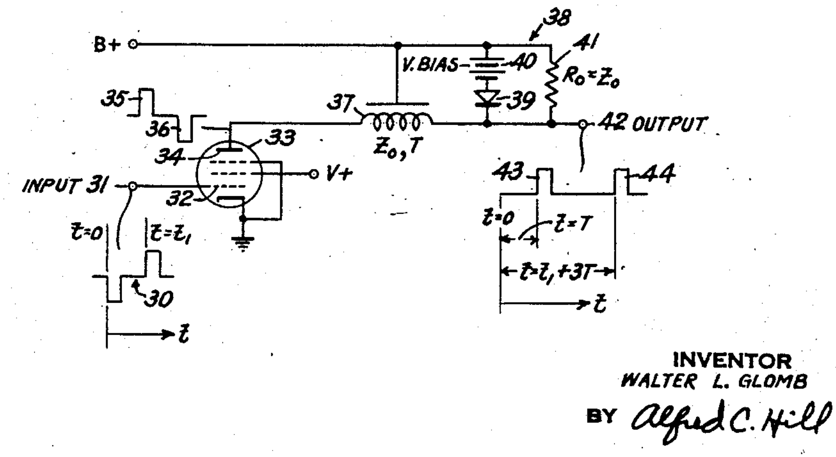

The above-mentioned and other features and objects of this invention will become more apparent by reference to the following description taken in conjunction with the accompanying drawings, in which:

Fig. 1 is a schematic diagram of the improved time delay circuit of this invention; and Figs. 2 and 3 are schematic diagrams of embodiments following the principles of this invention.

Referring to Fig. 1, an embodiment of the time delay circuit of this invention is illustrated as comprising a delay line 1 having a given delay time T, input terminal 2, output terminal 3 and a non-linear terminating impedance 4. Terminating impedance 4 is illustrated as including a parallel combination of a diode 5 poled as illustrated in the drawing of Fig. 1 and a resistance 6 having a resistive value equal to the characteristic impedance of line 1.

At time equals zero, a positive pulse of energy 7 is applied to terminal 2 and, hence, to grid 8 of triode 9. Pulse 7 causes current to flow through triode 9, the effective input impedance of line 1. At anode 10 there appears a negative pulse 11 which initiates a traveling wave on delay line 1 which arrives at terminating impedance 4 some time T later. The pulse arriving at impedance 4 has a negative polarity and, thus, causes the conduction of diode 5 resulting in a short circuit across the receiving end of line 1. Due to this short circuit, pulse 11 is reflected to cause a traveling wave of opposite polarity, as indicated by pulse 12, proceeding toward the input of line 1. The reflected pulse 12 arrives at the input of the line at a time 2T later. As illustrated, the input to line 1 is terminated in an open circuit, or substantially infinite impedance, hence, a reflected wave is initiated having the same polarity as pulse 12. This second reflected wave arrives at the receiving end of the line at a time equal to 3T later. Since this pulse arriving at impedance 4 is of positive polarity, diode 5 is non-conductive, thereby presenting a relatively high impedance to the pulse energy. However, since the effective impedance of non-conducting diode 5 is in parallel with resistance 6, the effective impedance of terminating impedance 4 is equal to the value of resistance 6, the characteristic impedance of line 1, thereby resulting in an output pulse 13 at terminal 3 and no reflection results. As illustrated, the output pulse 13 is delayed 3T from the initiation of pulse energy at input terminal 2, thereby effectively increasing the effective time delay of delay line 1 by a factor of 3.

It will be observed that the input and output pulses of the delay circuit of this invention, as illustrated in Fig. 1, are of the same polarity which enables the successful clipping of the output pulse in succeeding stages if the input pulse is of positive polarity. As is obvious, the employment of the triode 9 enables the accommodation of only positive input pulses in the circuit of Fig. 1. However, it is to be understood that a pentode may be substituted for triode 9 to enable the accommodation of input pulses of both polarities with the appropriate reversal of diode 5 and an accompanying bias voltage associated therewith in series to compensate for the quiescent plate voltage of a pentode amplifier. One restriction on the circuit of Fig. 1 is the disabling thereof by pulse energy having pulse widths greater than 2T and pulse repetition rate such that the spacing between pulses equals 2T.

In the past, it has been the practice to provide a 2.6 microsecond delay by using approximately 4 feet of commercially attainable delay line. Employing the circuit of this invention, the same delay can be obtained with 1.3 feet of line or a lumped constant line. It further has been possible to obtain a 0.35 to 0.55 microsecond delay with a lumped constant line. With the same number of sections and employing the circuit of this invention, the bandwidth of the line can be increased to three times that of the present lumped constant delay line.

Referring to Fig. 2, there is illustrated an embodiment of a circuit of Fig. 1 that may be used to generate a double-pulse signal which has utility as the synchronizing pulse generator of a pulse time modulation communication system. In this embodiment, a positive pulse 14 is applied to the input terminal 15 and, hence, to the grid 16 of the triode amplifier 17. At the anode 18 of device 17, there appears a negative pulse 19 which initiates a traveling wave along delay line 20 and, at the same time, causes diode 21 of the non-linear terminating impedance 22 to conduct. Thus, at the output terminal 23, a negative output pulse 24 occurring at time equal to zero appears. As will be observed, the terminating impedance 22 is a series-connected arrangement of diode 21 and a resistance 25 having a value equal to the characteristic impedance of line 20.

Returning now to the traveling wave initiated on line 20 by pulse 19, line 20 is terminating at the receiving end thereof in a short circuit. When pulse 19 encounters this short circuit, a reflected traveling wave is initiated of opposite polarity, as indicated by pulse 26. This positive traveling wave encounters at the input end of delay 20 the non-linear terminating impedance 22 which, in the case of a positive traveling wave, causes diode 21 to remain non-conductive, thereby presenting an effective infinite impedance for terminating impedance 22. The positive traveling wave 26 is reflected from the input end of line 20 without a reversal of polarity, as is illustrated by pulse energy 27. This pulse traverses delay line 20 and again encounters the short circuit at the receiving end thereof which initiates a second reflection of opposite polarity from traveling wave 27, as is illustrated by pulse 28. This negative pulse 28 traverses delay line 20 toward the input end thereof and encounters non-linear terminating impedance 22. Since the traveling wave incident on impedance 22 is of negative polarity, diode 21 is rendered conductive and a negative pulse output is removed from output terminal 23, as represented by pulse 29 delayed 4T from time zero or pulse 24. Thus, the embodiment of Fig. 2 produces at the output terminal 23 a double-pulse signal having a time delay between the two pulses thereof equal to four times the given delay of delay line 20.

As was mentioned hereinabove with respect to Fig. 1, the triode amplifier 17 can handle only positive input pulses. However, a pentode-type amplifier may be substituted for triode 17 to handle positive or negative polarities with the appropriate reversal of the polarity of diode 21 in impedance 22 to accommodate a negative input pulse and an associated bias voltage to effectively cancel the effect of the quiescent voltage drop of the pentode amplifier plate load.

Referring to Fig. 3, there is illustrated another embodiment of the delay time circuit of this invention which is capable of handling both negative and positive polarities of pulse input signals wherein the negative pulses are delayed 2T with respect to the positive pulse in a single circuit. The alternately negative and positive pulse input 30 is applied to the input terminal 31 and, hence, to the control grid 32 of the pentode amplifier 33. The input pulse signal of alternate negative and positive pulses are separated in time by a given amount of equal to $t_1$. The output at the anode 34 of pentode amplifier 33 includes a positive pulse 35 and a negative pulse 36, the result of the 180° phase shift experienced in the amplifier 33. This pulse signal initiates a traveling wave along delay line 37 toward the receiving end thereof.

At the receiving end of delay line 37, there is disposed the nonlinear terminating impedance 38 comprising a diode 39 in series with a bias voltage 40 and a resistance 41 disposed in parallel therewith whose value is equal to the characteristic impedance of line 37. The bias voltage 40 is necessary in the terminating impedance 38 of this embodiment to counteract or equal the quiescent plate voltage of the pentode amplifier 33.

The positive pulse 35 encounters at impedance 38 an effective impedance equal to the characteristic impedance of delay line 37, thereby providing at output 42 a positive pulse 43 delayed an amount equal to T from time equal zero. The negative pulse 36 traversing line 37 causes diode 39 to conduct, thereby presenting to this negative component of the input signal substantially a short circuit causing a reflection therefrom. This reflection establishes a traveling wave of positive polarity traveling toward the input end of line 37. The reflected traveling wave encounters at the input end of line 37 an open circuit of substantially infinite impedance which reflects the positive traveling wave toward the receiving end of delay line 37 without a reversal of polarity. When this positive reflected traveling wave encounters impedance 38, the diode 39 remains non-conductive and the impedance of the terminating impedance 38 is substantially of the characteristic impedance of 37, thereby enabling the extraction of a positive pulse 44 from output 42 without further reflections. The output pulse 44 of positive polarity is delayed 3T plus the initial spacing $t_1$ between the pulse components of the input signal and thereby delays a negative input pulse into line 37 2T with respect to the positive input pulse coupled thereto.

By appropriately reversing the polarity of diode 39 in the non-linear terminating impedance 38, it would be possible to delay in a single circuit positive input pulses 2T with respect to negative input pulses.

In each of the embodiments illustrated in the drawings of this invention and following the principles of this invention, a delay line of given time delay is terminated at one end thereof in a non-linear impedance which is responsive to the polarity of the pulses incident thereon. Pulses of one polarity cause the non-linear terminating impedance to present an effective impedance greater or less than the characteristic impedance of the delay line, thereby establishing a reflected traveling wave of polarity consistent with the value of the terminating impedance, that is, inverted polarity with respect to the incident wave if the non-linear impedance is effectively a short circuit and no reversal of polarity if the non-linear impedance is an effective open circuit. In response to pulses of the other polarity on the non-linear impedance, the non-linear impedance effectively terminates the delay line in its characteristic impedance, thereby enabling the removal of an output pulse therefrom of the same polarity as the wave incident thereon without reflection therefrom. By employing in combination with this non-linear impedance open or short circuits at the other end of the delay line, it is possible, in accordance with the principles of this invention, to effectively increase the given delay of the delay line by a factor equal to the number of traversals of pulse energy occurring in the delay line.

While I have described above the principles of my invention in connection with specific apparatus, it is to be clearly understood that this description is made only by way of example and not as a limitation to the scope of my invention as set forth in the objects thereof and in the accompanying claims.

I claim:

1. A time delay circuit comprising a delay line having a given time delay, said line having a terminating impedance at each end capable of reflecting pulse energy of certain polarity, one of said terminating impedances being adapted to invert pulses of a given polarity upon reflection thereof, the other of said terminating impedances being adapted to reflect pulses without inverting them, said one of said terminating impedances including means responsive to pulse energy traversing said line of polarity opposite to said given polarity to terminate said line in the characteristic impedance thereof, said line having input means for applying pulse energy thereto, and an output for said line coupled to said one of said terminating impedances to remove pulse energy from said line after it has traversed said line at least three times, said removed pulse energy having a polarity equal to said opposite polarity.

2. A time delay circuit comprising a delay line having a given time delay, said line having a terminating impedance at each end capable of reflecting pulse energy of certain polarity, one of said terminating impedances being adapted to invert pulses upon reflection thereof, the other of said terminating impedances being adapted to reflect pulses of a given polarity without inverting them, said other of said terminating impedances including means responsive to pulse energy traversing said line of polarity opposite to said given polarity to terminate said line in the characteristic impedance thereof, said line having input means for applying pulse energy thereto, and an output for said line coupled to said other of said terminating impedances to remove pulse energy from said line after it has traversed said line at least three times, said removed pulse energy having a polarity equal to said opposite polarity.

3. A time delay circuit comprising a delay line having a given time delay, a terminating impedance at each end of said line capable of reflecting pulse energy at least once, one of said terminating impedances being adapted to invert pulses upon reflection thereof and other of said terminating impedances being adapted to reflect without inversion, a selected one of said terminating impedances including means responsive to a given polarity of pulse energy traversing said line to terminate said line in its characteristic impedance after at least the first reflection therefrom, said line having input means for applying pulse energy thereto, and an output for said line coupled to said selected one of said terminating impedances to remove pulse energy from said line upon termination thereof in its characteristic impedance.

4. A time delay circuit comprising a delay line having a given time delay, a non-linear terminating impedance coupled to one end of said line, said non-linear terminating impedance being responsive to a given polarity of pulse energy traversing said line to terminate said line in its characteristic impedance and to the opposite polarity of pulse energy traversing said line to terminate said line to a reflecting impedance, means terminating the other end of said line in a reflecting impedance, input means coupled to said line to inject pulse energy therein of proper polarity to traverse said line at least three times prior to achieving said given polarity pulse energy at said non-linear terminating impedance, and output means coupled to said non-linear terminating impedance to remove pulse energy from said line upon occurrence of pulse energy of said given polarity.

5. A time delay circuit comprising a delay line having a given time delay, a parallel circuit including a normally non-conductive diode and a resistance equal in value to the characteristic impedance of said line terminating one end of said delay line, input means coupled to the other end of said delay line to inject pulse energy on said delay line of a given polarity, said given polarity pulse energy rendering said diode conductive thereby presenting a short-circuit termination to said injected pulse energy, said short-circuit termination inverting said given polarity pulse energy upon reflection thereof, an open circuit terminating said other end of said delay line to reflect the inverted pulse energy without inversion, and an output means for said line coupled at said one end of said delay line to remove said inverted pulse energy from said line, said parallel circuit responding to said inverted pulse energy to effectively terminate said delay line in its characteristic impedance.

6. A device according to claim 5, wherein said input means includes a pentode-type device and said parallel circuit includes a bias voltage source in series with said diode to equalize the quiescent voltage drop of the anode load of said pentode.

7. A time delay circuit comprising a delay line having a given time delay, a series circuit including a normally non-conductive diode and a resistance equal in value to the characteristic impedance of said line terminating one end of said delay line, said series circuit terminating said delay line in said characteristic impedance upon incidence of pulse energy of given polarity thereon and to reflect pulse energy without inversion incident thereon of polarity opposite to said given polarity, a short circuit terminating the other end of said delay line to reflect and invert pulse energy incident thereon, input means coupled to said one end of said delay line to inject pulse energy on said delay line of said given polarity, and output means coupled to said one end of said delay line to remove pulse energy therefrom at the instance of injection of pulse energy of said given polarity and pulse energy of said given polarity reflected from said short-circuit termination.

8. A time delay circuit comprising a delay line having a given time delay, a parallel circuit including a normally non-conductive diode and a resistance equal in value to the characteristic impedance of said line terminating one end of said delay line, input means coupled to the other end of said delay line to inject negative pulse energy on said delay line, said negative pulse energy rendering said diode conductive thereby presenting a short-circuit termination for said line to reflect and invert said negative pulse energy, an open circuit terminating said other end of said delay line to reflect without inversion the reflected positive pulse energy, and an output means for said line coupled at said one end of said delay line to remove said positive pulse energy from said line, said positive pulse energy maintaining said diode non-conductive to effectively terminate said delay line in its characteristic impedance.

9. A time delay circuit comprising a delay line having a given time delay, a parallel circuit including a normally non-conductive diode and a resistance equal in value to the characteristic impedance of said line terminating one end of said delay line, input means coupled to the other end of said delay line to inject pulse energy on said delay line having positive and negative components, said negative pulse energy rendering said diode conductive thereby presenting a short-circuit termination for said line to reflect and invert said negative pulse energy, an open circuit terminating said other end of said delay line to reflect without inversion the reflected positive pulse energy, and an output means for said line coupled at said one end of said delay line to remove the positive component of said injected pulse energy and reflected positive pulse energy from said line, positive pulse energy maintaining said diode non-conductive to effectively terminate said delay line in its characteristic impedance, said reflected positive pulse energy being displaced from said positive component by a time equal to the number of traversals of said delay line by said reflected positive pulse energy times said given delay.

10. A time delay circuit comprising a delay line having a given time delay, a series circuit including a normally non-conductive diode and a resistance equal in value to the characteristic impedance of said delay line terminating one end of said delay line, said series circuit terminating said delay line in said characteristic impedance upon incidence of negative pulse energy thereon by conduction of said diode and to reflect positive pulse energy without inversion by non-conduction of said diode, a short circuit terminating the other end of said delay line to reflect and invert pulse energy incident thereon, input means coupled to said one end of said delay line to inject negative pulse energy on said delay line, and output means coupled intermediate said diode and said resistance to remove pulse energy therefrom at the instance of injection of negative pulse energy and negative pulse energy reflected from said short-circuit termination.

References Cited in the file of this patent

UNITED STATES PATENTS

| | | |
|---|---|---|
| 2,658,998 | Hyman | Nov. 10, 1953 |
| 2,659,052 | Bess | Nov. 10, 1953 |
| 2,729,793 | Anderson | Jan. 3, 1956 |
| 2,763,841 | Simkins | Sept. 18, 1956 |
| 2,784,310 | Cowan | Mar. 5, 1957 |